United States Patent
Kim et al.

(10) Patent No.: US 9,536,662 B2
(45) Date of Patent: Jan. 3, 2017

(54) MULTILAYER CERAMIC CAPACITOR AND MOUNTING BOARD FOR MOUNTING THEREOF

(71) Applicant: SAMSUNG ELECTRO-MECHANICS CO., LTD., Suwon-Si, Gyeonggi-Do (KR)

(72) Inventors: Hyun Tae Kim, Suwon-Si (KR); Kyoung Nam Hwang, Suwon-Si (KR); Hwi Geun Im, Suwon-Si (KR); Ho Jun Lee, Suwon-Si (KR); Young Ghyu Ahn, Suwon-Si (KR); Woo Jin In, Suwon-Si (KR)

(73) Assignee: SAMSUNG ELECTRO-MECHANICS CO., LTD., Suwon-Si, Gyeonggi-Do (KR)

(*) Notice: Subject to any disclaimer, the term of this patent is extended or adjusted under 35 U.S.C. 154(b) by 92 days.

(21) Appl. No.: 14/614,207

(22) Filed: Feb. 4, 2015

(65) Prior Publication Data
US 2015/0318113 A1    Nov. 5, 2015

(30) Foreign Application Priority Data
May 2, 2014    (KR) .................... 10-2014-0053510

(51) Int. Cl.
| | | |
|---|---|---|
| H01G 2/06 | (2006.01) | |
| H01G 4/30 | (2006.01) | |
| H01G 4/248 | (2006.01) | |
| H01G 4/012 | (2006.01) | |
| H01G 4/12 | (2006.01) | |
| H01G 4/232 | (2006.01) | |
| H01G 4/005 | (2006.01) | |

(52) U.S. Cl.
CPC .............. *H01G 2/065* (2013.01); *H01G 4/005* (2013.01); *H01G 4/012* (2013.01); *H01G 4/1227* (2013.01); *H01G 4/232* (2013.01); *H01G 4/248* (2013.01); *H01G 4/30* (2013.01)

(58) Field of Classification Search
CPC ............ H01G 4/30; H01G 4/12; H01G 4/012; H01G 4/232; H01G 2/065; H01G 4/005; H01G 2/06; H01G 4/228; H01G 4/40; H01G 2/04; H01G 4/252
See application file for complete search history.

(56) References Cited

U.S. PATENT DOCUMENTS

| | | | |
|---|---|---|---|
| 6,243,253 B1 * | 6/2001 | DuPre ................... | H01G 2/065 361/301.4 |
| 2013/0058006 A1 * | 3/2013 | Kim ....................... | H01G 4/12 361/321.2 |

FOREIGN PATENT DOCUMENTS

KR    10-2009-0117686 A    11/2009

* cited by examiner

*Primary Examiner* — Dion R Ferguson
(74) *Attorney, Agent, or Firm* — McDermott Will & Emery LLP (57) ABSTRACT

A multilayer ceramic capacitor includes: a ceramic body including a plurality of dielectric layers and a plurality of first and second internal electrodes stacked in a width direction; a pair of first external electrodes disposed on a mounting surface of the ceramic body to be spaced apart from one another and connected to the plurality of first internal electrodes; a second external electrode disposed between the pair of first external electrodes on the mounting surface of the ceramic body and connected to the plurality of second internal electrodes; and a dummy electrode disposed on a surface of the ceramic body opposing the mounting surface of the ceramic body.

20 Claims, 9 Drawing Sheets

MULTILAYER CERAMIC CAPACITOR AND MOUNTING BOARD FOR MOUNTING THEREOF

CROSS-REFERENCE TO RELATED APPLICATION

This application claims the priority and benefit of Korean Patent Application No. 10-2014-0053510 filed on May 2, 2014, with the Korean Intellectual Property Office, the disclosure of which is incorporated herein by reference.

BACKGROUND

The present disclosure relates to a multilayer ceramic capacitor (MLCC) and a mounting board for mounting thereof.

A multilayer ceramic capacitor has advantages such as a small size, high capacitance, ease of mounting, and the like.

Such a multilayer ceramic capacitor is a chip type condenser commonly mounted on the boards of several types of electronic products, such as computers, personal digital assistants (PDAs), cellular phones, and the like, to play an important role in the charging of electricity therein or in the discharging of electricity therefrom and has various sizes and various stacked manners, based on an intended purpose of use and a level of capacitance thereof.

Among multilayer ceramic capacitors, a product requiring low equivalent series inductance (ESL) characteristics may be provided.

Such a multilayer ceramic capacitor may have a three-terminal structure in which three external electrodes are disposed on a mounting surface thereof to be spaced apart from one another in order to satisfy the requirement for low ESL characteristics, thereby allowing ESL characteristics to be maintained at a low level.

Multilayer ceramic capacitors having a three-terminal structure according to the related art are manufactured and then inserted into a measurement device for testing electrical characteristics of the multilayer ceramic capacitors. However, the multilayer ceramic capacitors inserted into the measurement device may collide with one another or may be subjected to friction therebetween within the measurement device, such that a portion of a ceramic body in which external electrodes are not formed, for example, a portion of a surface of the ceramic body opposing the mounting surface, may be damaged.

This problem may be partially solved through a structure in which three external electrodes are formed symmetrically with respect to one another in each of upper and lower portions of the multilayer ceramic capacitor having the three-terminal structure.

However, in the case of the multilayer ceramic capacitor having a structure in which three terminals are formed to be vertically symmetrical with respect to one another, issues may arise in that a pick-up rate may be reduced in a process of picking up a product using a pick-up device after the product is produced.

A nozzle of the pick-up device may be larger than a width of an external electrode disposed in the center of the ceramic body, but may be smaller than widths of external electrodes disposed on both end portions of the ceramic body, respectively.

In the case of the multilayer ceramic capacitor having a structure in which the three terminals are formed to be vertically symmetrical with respect to one another, an external electrode disposed in the center of an upper surface of the ceramic body is positioned in the center of a nozzle hole of the pick-up device. Here, since an inner diameter of the nozzle is larger than the width of the external electrode disposed in the center of the ceramic body, empty spaces are formed in the nozzle on at both sides of the external electrode disposed in the center of the ceramic body, and a vacuum state may be released through the spaces.

Such a phenomenon may prohibit a pick-up process from being properly performed when the product is picked up, and may cause the product to be twisted at the time of picking up the product, such that a pick-up rate is relatively decreased.

SUMMARY

An aspect of the present disclosure may provide a multilayer ceramic capacitor which may remain undamaged during a test of electrical characteristics of the multilayer ceramic capacitor conducted in a measurement device, and may increase a pick-up rate in a pick-up process.

According to an aspect of the present disclosure, a multilayer ceramic capacitor may include three external electrodes disposed on a mounting surface of a ceramic body to be spaced apart from one another and a dummy electrode disposed on a surface of the ceramic body opposing the mounting surface of the ceramic body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedron will be defined in order to clearly describe exemplary embodiments in the present disclosure.

L, W and T indicated in the accompanying drawings refer to a length direction, a width direction, and a thickness direction, respectively.

Multilayer Ceramic Capacitor

Figure 1:
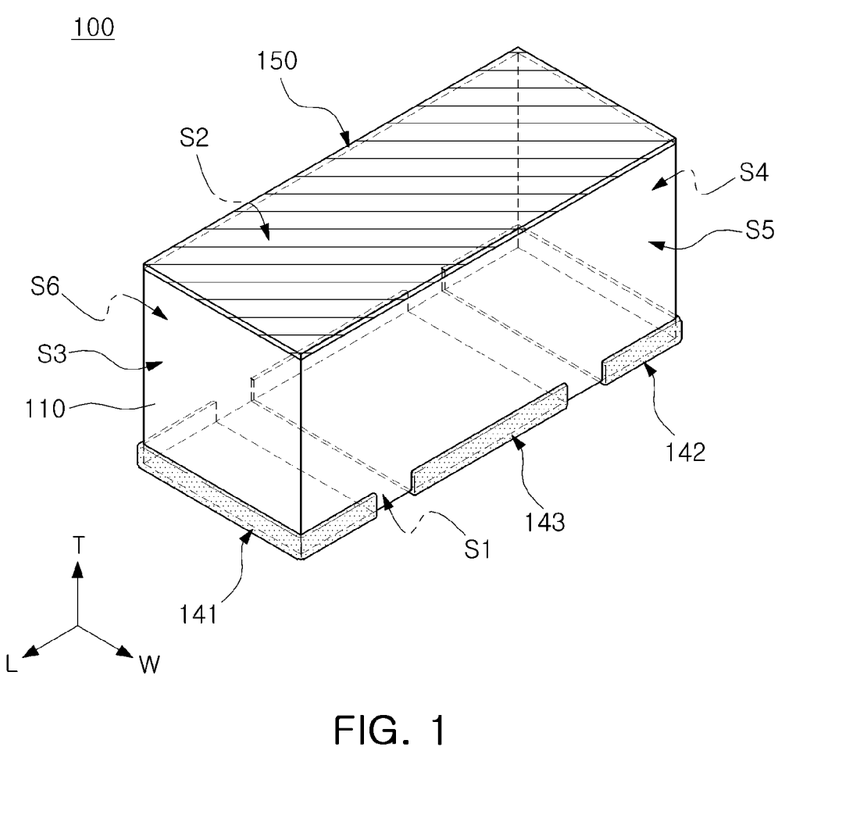
FIG. 1 is a perspective view schematically illustrating a multilayer ceramic capacitor according to an exemplary embodiment in the present disclosure.
Figure 2:
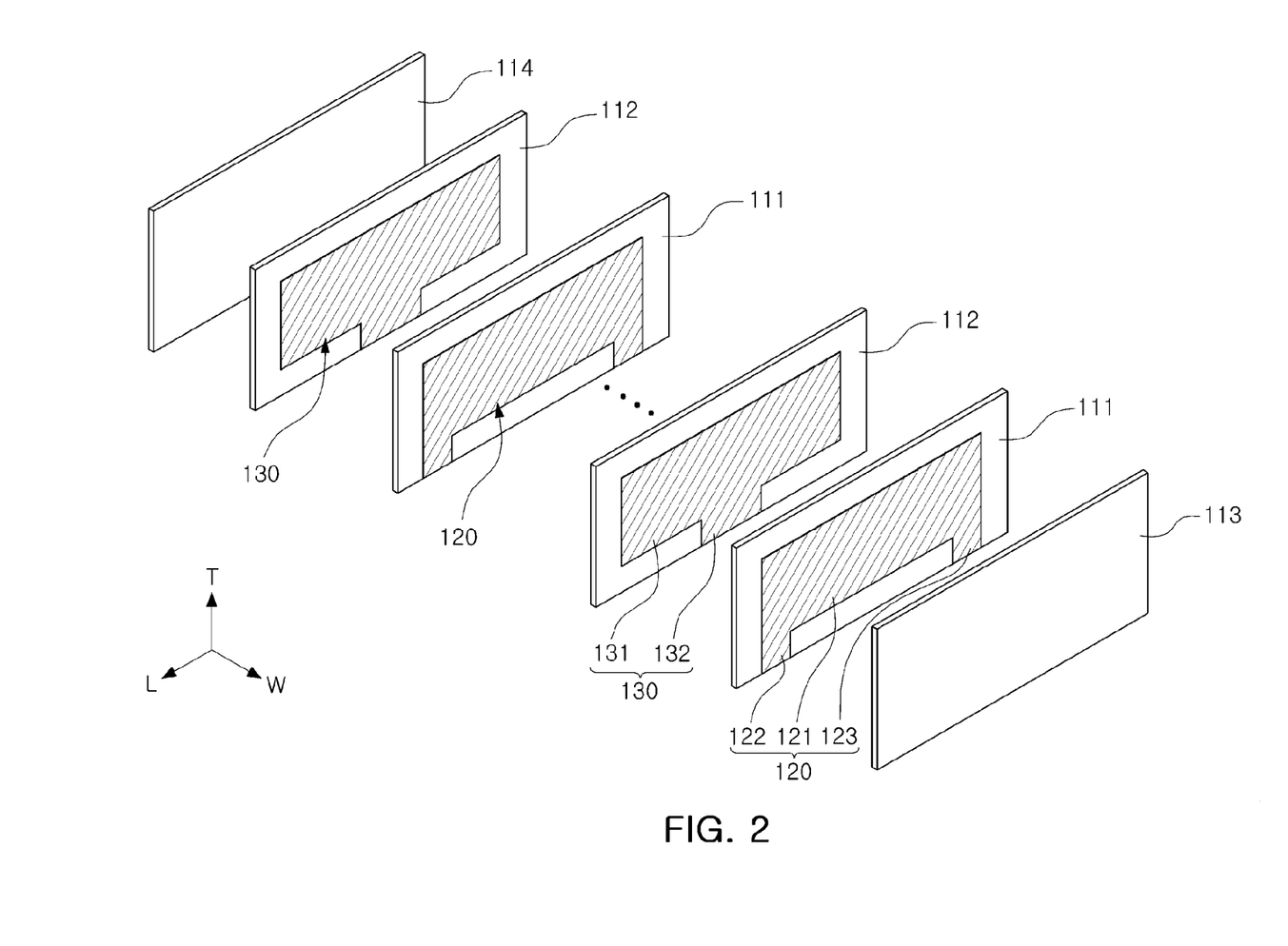
FIG. 2 is an exploded perspective view illustrating a multilayer structure of first and second internal electrodes of a multilayer ceramic capacitor according to an exemplary embodiment in the present disclosure.
Figure 3:
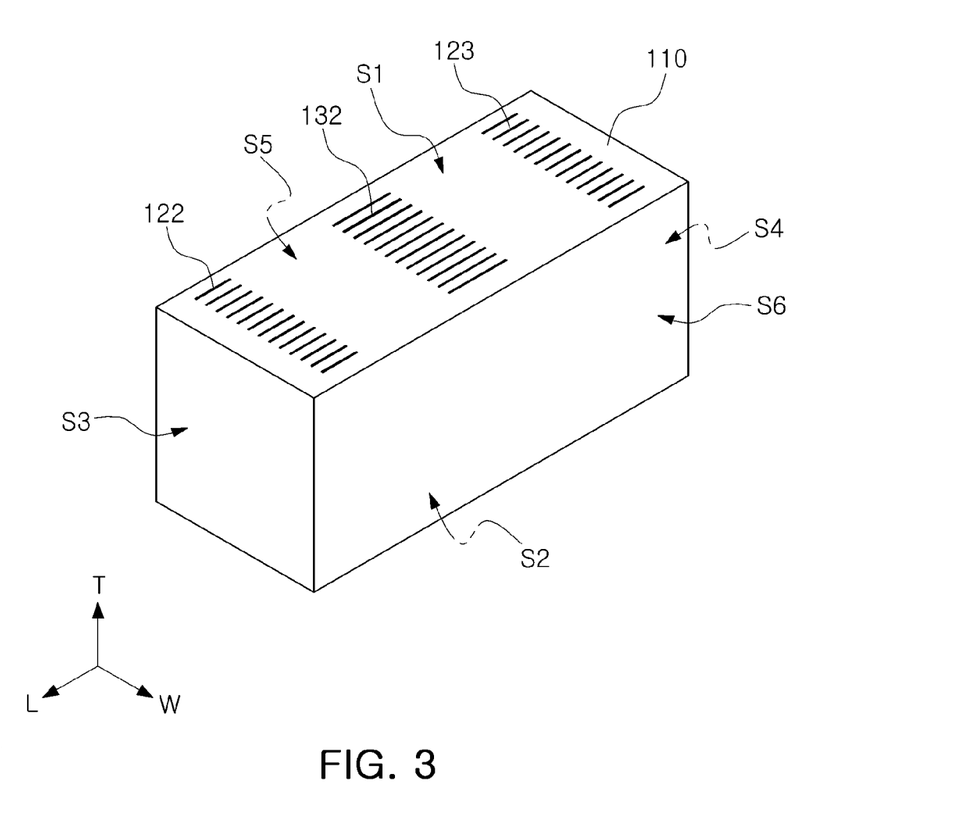
FIG. 3 is a perspective view illustrating a bottom surface of a ceramic body of a multilayer ceramic capacitor according to an exemplary embodiment in the present disclosure.
Figure 4:
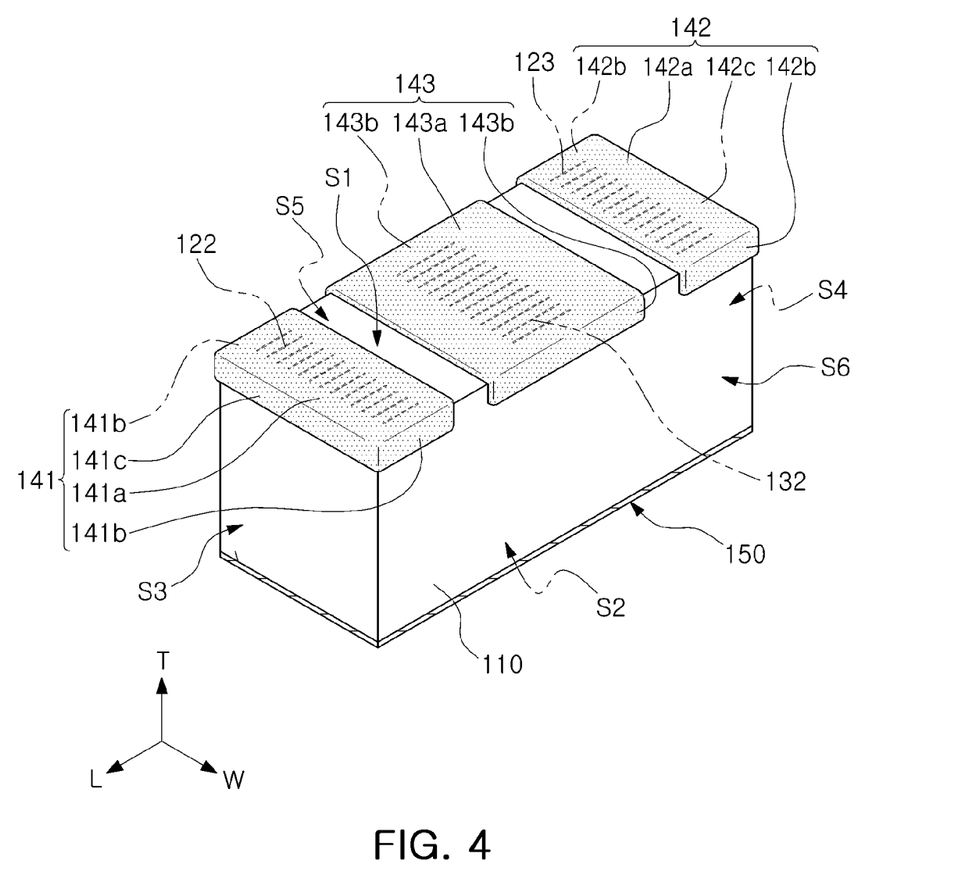
FIG. 4 is a perspective view illustrating a bottom surface of a multilayer ceramic capacitor according to an exemplary embodiment in the present disclosure.

FIG. 1 is a perspective view schematically illustrating a multilayer ceramic capacitor according to an exemplary embodiment in the present disclosure; FIG. 2 is an exploded perspective view illustrating a multilayer structure of first and second internal electrodes of a multilayer ceramic capacitor according to an exemplary embodiment in the present disclosure; FIG. 3 is a perspective view illustrating a bottom surface of a ceramic body of a multilayer ceramic capacitor according to an exemplary embodiment in the present disclosure; and FIG. 4 is a perspective view illustrating a bottom surface of a multilayer ceramic capacitor according to an exemplary embodiment in the present disclosure.

Referring to FIGS. 1 through 4, a multilayer ceramic capacitor 100 according to the present exemplary embodiment may include a ceramic body 110 having a plurality of dielectric layers 111 and 112 stacked in a width direction thereof, a plurality of first and second internal electrodes 120 and 130, a pair of first external electrodes 141 and 142, a second external electrode 143, and a dummy electrode 150.

The multilayer ceramic capacitor 100 according to the present exemplary embodiment may be a three-terminal capacitor having a total of three external terminals disposed on a mounting surface thereof.

The ceramic body 110 may be formed by stacking the plurality of dielectric layers 111 and 112 in the width direction and then sintering the plurality of dielectric layers 111 and 112. A shape and a dimension of the ceramic body 110 and the number of dielectric layers 111 and 112 to be stacked are not limited to examples illustrated in FIGS. 1 through 4.

In addition, the plurality of dielectric layers 111 and 112 configuring the ceramic body 110 may be in a sintered state. Adjacent dielectric layers 111 and 112 may be integrated with one another such that boundaries therebetween are not readily discernible without a scanning electron microscope (SEM).

In addition, the ceramic body 110 may have a hexahedral shape.

Further, in the present exemplary embodiment, for ease of description, lower and upper surfaces S1 and S2 refer to surfaces of the ceramic body 110 opposing one another in the thickness direction, first and second end surfaces S3 and S4 refers to both end surfaces of the ceramic body 110 connecting the lower and upper surfaces S1 and S2 and opposing one another in a length direction thereof, and first and second side surfaces S5 and S6 refer to both side surfaces of the ceramic body 110 vertically intersecting with the first and second end surfaces S3 and S4 and opposing one another in the width direction.

Hereinafter, in the present exemplary embodiment, a description will be provided on the assumption that a mounting surface of the multilayer ceramic capacitor 100 is the lower surface S1 of the ceramic body 110.

The ceramic body 110 may include an active region, which is a portion contributing to forming capacitance of the multilayer ceramic capacitor, and left and right cover layers 113 and 114 disposed, as left and right margin parts, at left and right sides of the active region in the width direction, respectively.

The active region may be formed by repeatedly stacking the plurality of first and second internal electrodes 120 and 130 in the width direction with each of the dielectric layers 111 and 112 interposed therebetween.

The left and right cover layers 113 and 114 may be formed of the same material as that of the dielectric layers 111 and 112 of the active region and have the same configuration as that of the dielectric layers 111 and 112 of the active region except that the left and right cover layers 113 and 114 do not include internal electrodes. However, the material and the configuration of the left and right cover layers 113 and 114 are not limited thereto.

The left and right cover layers 113 and 114 may be formed of a single dielectric layer or be formed by stacking two or more dielectric layers on left and right surfaces of the active region in the width direction, respectively, and may basically serve to prevent damage to the first and second internal electrodes 120 and 130 due to physical or chemical stress.

The dielectric layers 111 and 112 may contain a ceramic material having a high-k, for example, barium titanate ($BaTiO_3$) based powder particles or strontium titanate ($SrTiO_3$) based powder particles. However, the type of material contained in the dielectric layers 111 and 112 is not limited thereto as long as a sufficient level of capacitance may be obtained.

In addition, the dielectric layers 111 and 112 may further contain ceramic additives, organic solvents, plasticizers, binders, dispersants, and the like, as necessary, in addition to the ceramic powder particles.

The ceramic additive may be a transition metal oxide or carbide, a rare earth element, magnesium (Mg), aluminum (Al), or the like. However, the type of the ceramic additive is not limited thereto.

Here, a thickness of the dielectric layers 111 and 112 may be arbitrarily changed based on a capacitance design of the multilayer ceramic capacitor 100.

The first and second internal electrodes 120 and 130, which have different polarities, may be disposed to be exposed through the lower surface S1 of the ceramic body 110 in the width direction of the dielectric layers 111 and 112 by printing conductive pastes including a conductive metal to have a predetermined thickness on one surfaces of the dielectric layers 111 and 112, respectively, and may be electrically insulated from one another by the dielectric layers 111 and 112 disposed therebetween.

The first internal electrode 120 may include a first body part 121 disposed to be spaced apart from the first and second end surfaces S3 and S4 of the ceramic body 110 in the length direction and a pair of first lead parts 122 and 123 extended from the first body part 121 toward the lower surface S1 of the ceramic body 110, that is, the mounting surface of the ceramic body 110, and disposed to be spaced apart from one another in the length direction.

The second internal electrode 130 may include a second body part 131 disposed to be spaced apart from the first and second end surfaces S3 and S4 of the ceramic body 110 in the length direction and overlapping the first body part 121 in the width direction and a second lead part 132 extended from the second body part 131 toward the lower surface S1 of the ceramic body 110, that is, the mounting surface of the ceramic body 110, and disposed between the pair of first lead parts 122 and 123.

In addition, a material forming the first and second internal electrodes 120 and 130 is not particularly limited, but may be a conductive paste, or the like, formed of at least one selected from the group consisting of, for example, a noble metal material such as palladium (Pd), a palladium-silver (Pd—Ag) alloy, or the like, nickel (Ni), and copper (Cu).

In addition, as a method of printing the conductive paste, a screen printing method, a gravure printing method, or the like, may be used. However, the method of printing of the conductive paste is not limited thereto.

The first external electrodes 141 and 142 may be formed on the lower surface S1 of the ceramic body 110 to be spaced apart from one another in the length direction, and may be electrically connected to the pair of first lead parts 122 and 123, respectively.

Here, the pair of first external electrodes 141 and 142 may include body parts 141a and 142a formed on the lower surface S1 of the ceramic body 110, respectively, band parts 141c and 142c extended from the body parts 141a and 142a onto portions of the first and second end surfaces S3 and S4 of the ceramic body 110 in the length direction, respectively, and band parts 141b and 142b extended from the body parts 141a and 142a, respectively, onto portions of both of the first and second side surfaces S5 and S6 of the ceramic body 110 in the width direction, as necessary.

Here, the first external electrodes 141 and 142 may be extended from the lower surface S1 of the ceramic body 110 only onto portions of both end surfaces S3 and S4 of the ceramic body 110 in the length direction, or only onto portions of the respective first and second side surfaces S5 and S6 of the ceramic body 110 in the width direction, according to cases.

The second external electrode 143 may be formed between the pair of first external electrodes 141 and 142 on the lower surface S1 of the ceramic body 110 to be spaced apart from the pair of first external electrodes 141 and 142, and may be electrically connected to the second lead parts 132.

Here, the second external electrode 143 may include a body part 143a formed on the lower surface S1 of the ceramic body 110, and band parts 143b extended from the body part 143a onto portions of both of the first and second side surfaces S5 and S6 of the ceramic body 110 in the width direction, as necessary.

The first and second external electrodes 141 to 143 may be formed of conductive pastes including a conductive metal.

The conductive metal may be Ni, Cu, Pd, gold (Au), or an alloy thereof. However, the type of the conductive metal is not limited thereto.

In the multilayer ceramic capacitor 100 having the structure as described above, since the first external electrodes 141 and 142 and the second external electrode 143 are formed on the same surface of the ceramic body 110 and the second external electrode 143 is disposed between the pair of first external electrodes 141 and 142 while being adjacently thereto, a length of a current loop formed between a positive electrode and a negative electrode may be significantly decreased to decrease equivalent series inductance (ESL) dominating high frequency characteristics of the multilayer ceramic capacitor 100 and to improve ESL dispersion, thereby improving impedance characteristics of a chip.

Meanwhile, in the present exemplary embodiment, the first and second external electrodes 141 to 143 may further include a plating layer. The plating layer may include a Ni plating layer (not illustrated) formed on the first and second external electrodes 141 to 143 and a tin (Sn) plating layer (not illustrated) formed on the Ni plating layer.

The dummy electrode 150 may entirely cover the upper surface S2 of the ceramic body 110 opposing the mounting surface of the ceramic body 110.

In addition, the dummy electrode 150 may be formed of the same conductive metal as that of the first or second external electrodes 141 to 143. However, the type of material forming the dummy electrode 150 is not limited thereto. For example, the dummy electrode 150 may be formed of an insulating material such as epoxy, as necessary.

Even in a case in which the multilayer ceramic capacitors inserted into a measurement device for testing electrical characteristics of the multilayer ceramic capacitors collide with one another or are subjected to friction therebetween within the measurement device, the dummy electrode 150 may serve as a protection film preventing such collision impacts and friction, thereby preventing damage to a portion of the multilayer ceramic capacitor in which the external electrodes are not formed, for example, a portion of the upper surface S2 opposing the mounting surface of the ceramic body 110.

In addition, the dummy electrode 150 may allow the upper surface S2 of the ceramic body 110 to be in a state in which the upper surface S2 is flat without being bent, thereby allowing a nozzle of a pick-up device to easily pick up the upper surface S2 of the ceramic body 110 that is flat.

Therefore, a twist of the multilayer ceramic capacitor or a defect causing a pick-up failure may be eliminated.

In addition, the dummy electrode 150 may serve as a protection film protecting the upper surface S2 of the ceramic body 110 from impacts that may occur at the time of performing several manufacturing processes.

Figure 5:
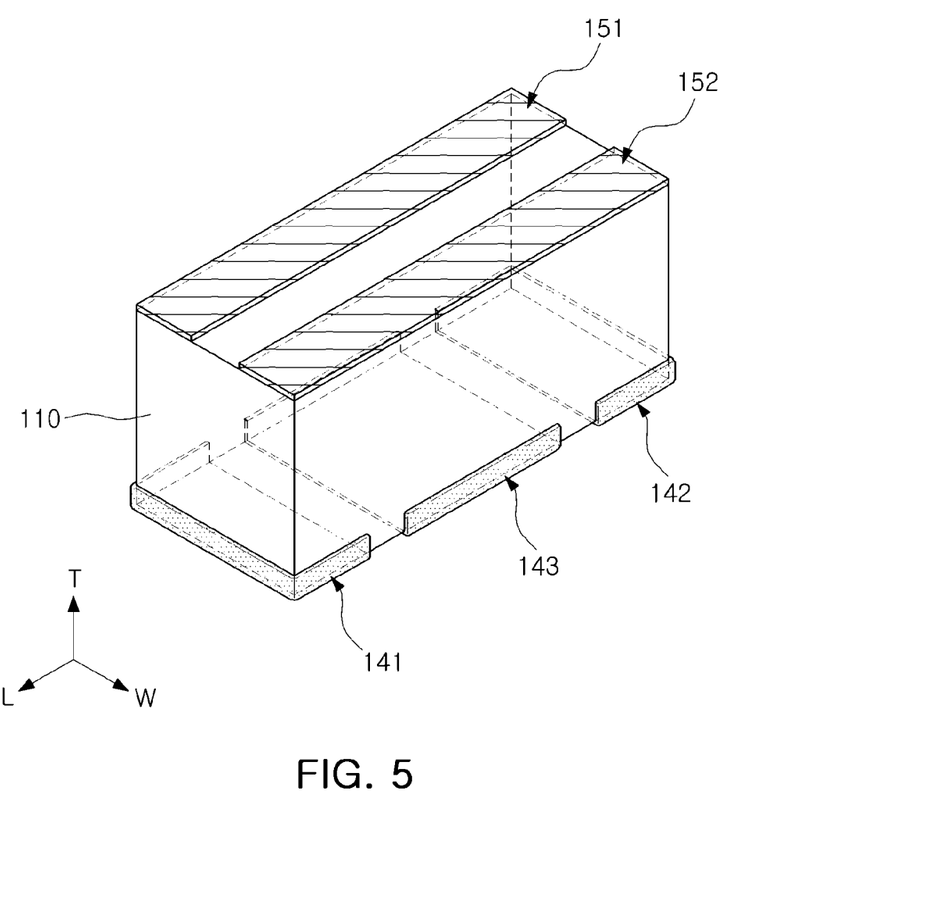
FIG. 5 is a perspective view schematically illustrating a multilayer ceramic capacitor according to another exemplary embodiment in the present disclosure.

FIG. 5 is a perspective view schematically illustrating a multilayer ceramic capacitor according to another exemplary embodiment in the present disclosure.

Referring to FIG. 5, the dummy electrode may include first and second dummy electrodes 151 and 152 disposed on the upper surface S2 of the ceramic body 110 opposing the mounting surface of the ceramic body 110 to be spaced apart from one another in the width direction thereof.

Here, one sides of the first and second dummy electrodes 151 and 152 in the width direction may be disposed at positions close to edges of the ceramic body 110 in the width direction, on the upper surface S2 of the ceramic body 110, respectively. However, the positions of the first and second dummy electrodes 151 and 152 are not limited thereto.

In addition, the first and second dummy electrodes 151 and 152 may be extended onto at least one of portions of the respective first and second end surfaces S3 and S4 and the first and second side surfaces S5 and S6 of the ceramic body 110, as necessary.

Such shapes of the first and second dummy electrodes 151 and 152 as described above may allow a twist of the ceramic body 110 to be relatively reduced, and may allow both edge portions of the ceramic body 110 in the width direction to be reinforced against chipping thereof, since both sides of the first and second dummy electrodes 151 and 152 are picked up by the nozzle of the pick-up device at the time of performing a pick-up process.

In addition, this structure may have benefits of reductions in applying materials, a cost of plating materials, and the like, as compared to the structure of FIG. 1 in which the dummy electrode entirely covers the upper surface S2 of the ceramic body 110.

In addition, in a case in which the entirety of the upper surface S2 of the ceramic body 110 is applied with a material as in FIG. 1, issues such as an additional firing/drying process required to be performed and a phenomenon of chips being attached to one another at the time of performing the additional firing/drying process, occurring due to an increase in non-uniformity of flatness in the electrode and an increase in an area onto which the material is applied may be significantly decreased.

Figure 6:
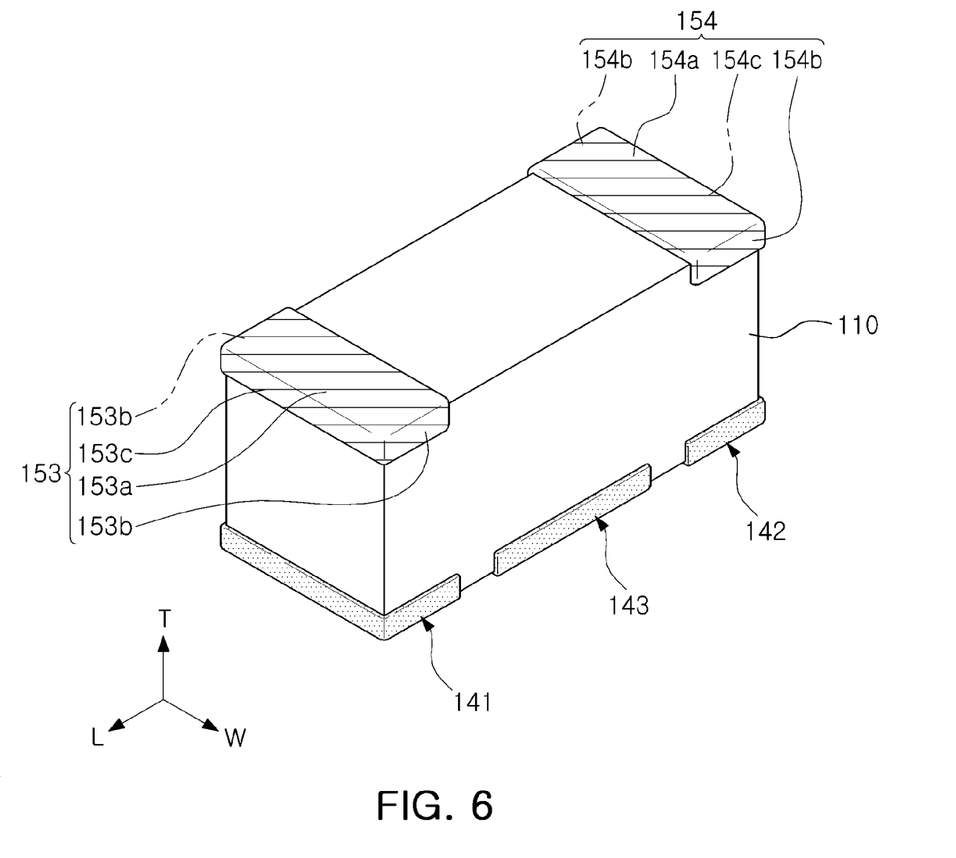
FIG. 6 is a perspective view schematically illustrating a multilayer ceramic capacitor according to another exemplary embodiment in the present disclosure.

FIG. 6 is a perspective view schematically illustrating a multilayer ceramic capacitor according to another exemplary embodiment in the present disclosure.

Referring to FIG. 6, the dummy electrode may include first and second dummy electrodes 153 and 154 disposed on the upper surface S2 of the ceramic body 110 opposing the mounting surface of the ceramic body 110 to be spaced apart from one another in the length direction.

A gap between the first and second dummy electrodes 153 and 154 respectively formed in portions of the upper surface S2 in which the ceramic body 110 is picked up may be larger than a size of the nozzle of the pick-up device, such that the nozzle may be positioned on the upper surface S2 of the ceramic body 110 that is flat.

As described above, the nozzle may be positioned on the upper surface S2 of the ceramic body 110 that is flat, thereby preventing shaking of the nozzle at the time of performing the pick-up process. Therefore, a pick-up rate may be increased.

In addition, the first and second dummy electrodes 153 and 154 may serve to decrease impacts that may occur in both edge portions of the ceramic body 110 in the length direction.

According to the structure as described above, materials used for forming the dummy electrodes may be significantly reduced, and work efficiency may not considerably differ from that of FIG. 1.

In addition, since the dummy electrodes are formed to be vertically symmetrical to the first external electrodes of the multilayer ceramic capacitor, when the multilayer ceramic capacitor is mounted on a board, the device may use the multilayer ceramic capacitor without applying additional settings thereto.

Meanwhile, in the multilayer ceramic capacitor according to the other exemplary embodiment in the present disclosure, the first and second dummy electrodes 153 and 154 may be disposed in the length direction of the ceramic body 110, such that a gap between the first and second dummy electrodes 153 and 154 is smaller than a size of the nozzle, thereby allowing portions of the respective first and second dummy electrodes 153 and 154 to be positioned within an inner diameter of the nozzle.

The portions of the respective first and second dummy electrodes 153 and 154 may be positioned within the inner diameter of the nozzle to prevent the shaking of the nozzle at the time of performing the pick-up process, thereby increasing the pick-up rate.

In addition, impacts that may occur at both ends of the ceramic body 110 may be decreased.

In addition, since the dummy electrodes are formed to be vertically symmetrical to the first external electrodes of the multilayer ceramic capacitor, when the multilayer ceramic capacitor is mounted on the board, the device may use the multilayer ceramic capacitor without applying additional settings thereto.

Here, the first and second dummy electrodes 153 and 154 may include body parts 153a and 154a disposed on the upper surface S2 of the ceramic body 110, respectively, band parts 153c and 154c extended from the body part 153a and 154a onto portions of the first and second end surfaces S3 and S4 of the ceramic body 110 in the length direction, respectively, and band parts 153b and 154b extended from the body parts 153a and 154a, respectively, onto portions of both of the first and second side surfaces S5 and S6 of the ceramic body 110 in the width direction, as necessary.

Figure 7:
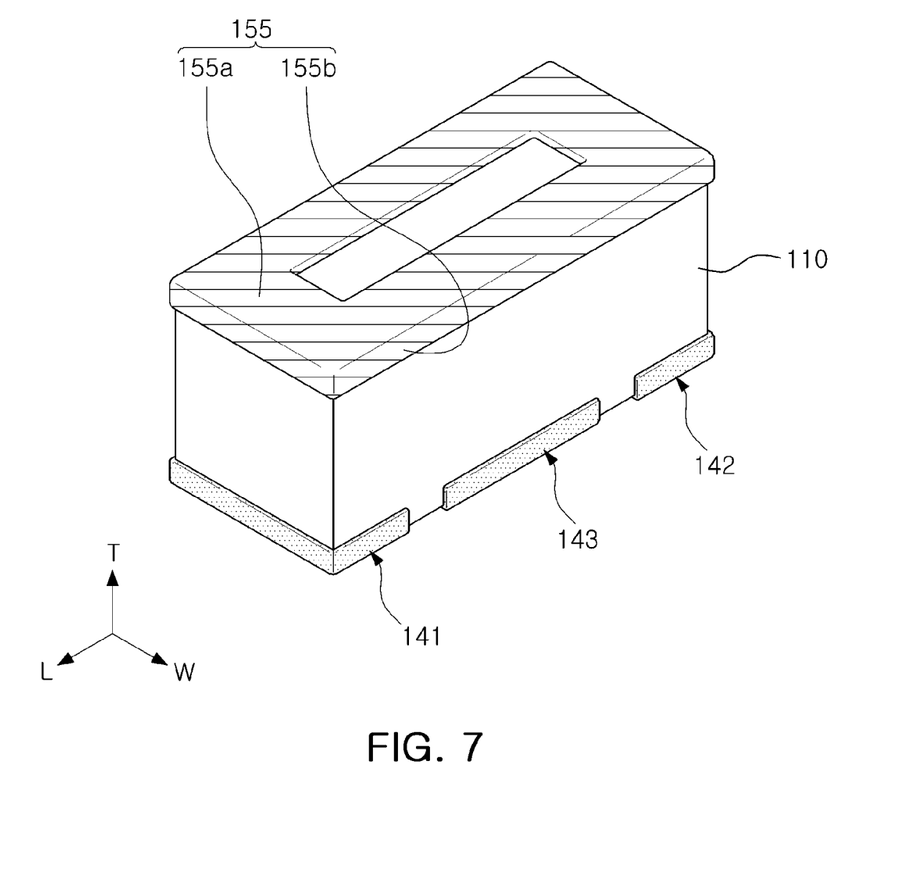
FIG. 7 is a perspective view schematically illustrating a multilayer ceramic capacitor according to another exemplary embodiment in the present disclosure.

FIG. 7 is a perspective view schematically illustrating a multilayer ceramic capacitor according to another exemplary embodiment in the present disclosure.

Referring to FIG. 7, a dummy electrode 155 may be disposed as a frame along edges of the upper surface S2 of the ceramic body 110 opposing the mounting surface of the ceramic body 110.

This structure, which has a shape capable of significantly decreasing occurrence of chipping, may serve to protect all portions of the upper surface S2 of the ceramic body 110 on which the chipping may occur.

In addition, this structure may significantly decrease a material cost as compared to the structure of FIG. 1, and may significantly increase a pick-up rate and a chipping control effect by changing a width of the ceramic body.

Here, the dummy electrode 155 may include a body part 155a disposed on the upper surface S2 of the ceramic body 110, and band parts 155b extended from the body part 155a onto portions of the respective first and second side surfaces S5 and S6 of the ceramic body 110 in the width direction and portions of the respective first and second end surfaces S3 and S4 of the ceramic body 110 in the length direction, as necessary.

Mounting Board for Mounting Multilayer Ceramic Capacitor

Figure 8:
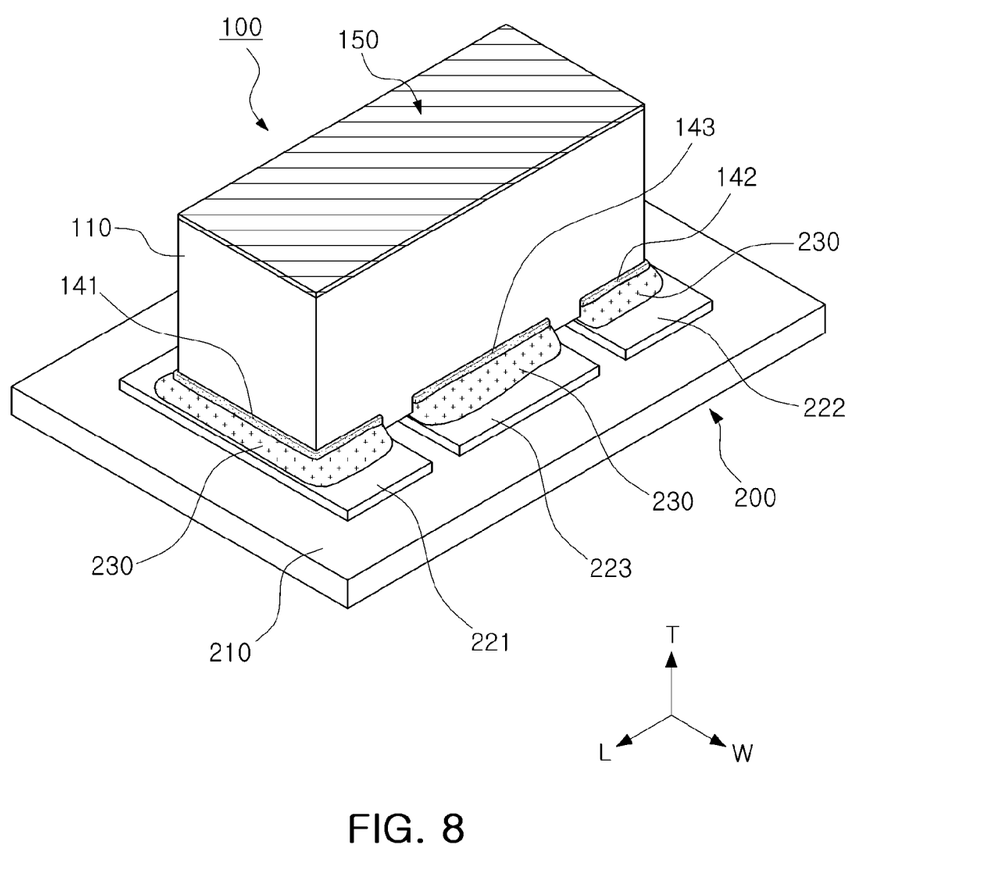
FIG. 8 is a perspective view illustrating a form in which the multilayer ceramic capacitor of FIG. 1 is mounted on a board.
Figure 9:
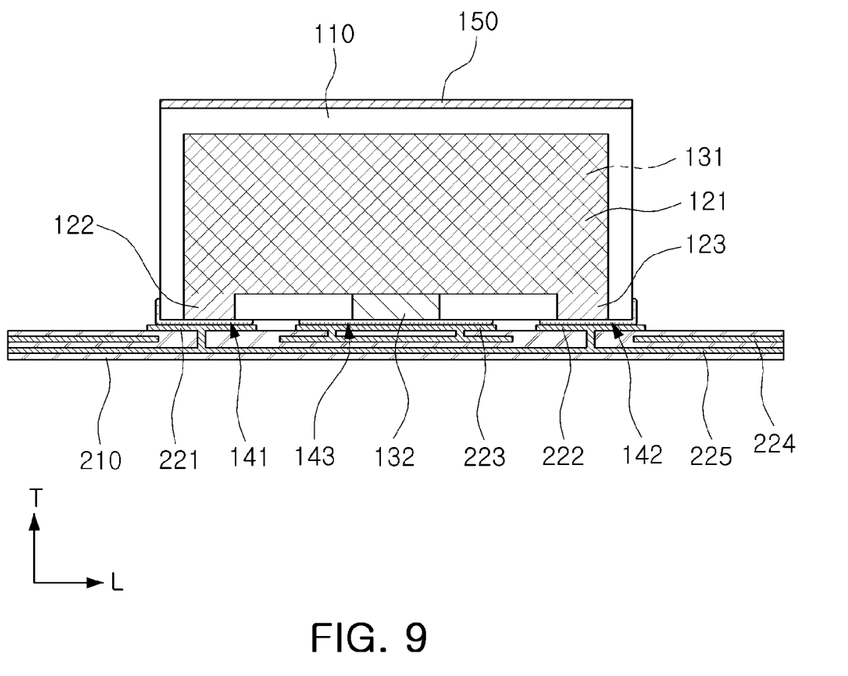
FIG. 9 is a lateral cross-sectional view of FIG. 8.

FIG. 8 is a perspective view illustrating a form in which the multilayer ceramic capacitor of FIG. 1 is mounted on a board; and FIG. 9 is a lateral cross-sectional view of FIG. 8.

A mounting board 200 for mounting a multilayer ceramic capacitor 100 according to an exemplary embodiment in the present disclosure may include aboard 210 having the multilayer ceramic capacitor 100 mounted thereon and a plurality of electrode pads 221 to 223 formed on an upper surface of the board 210 to be spaced apart from one another.

Referring to FIGS. 8 and 9, since the board according to the present exemplary embodiment is a board on which a capacitor having a three-terminal structure is mounted, the board may include first to third electrode pads 221 to 223. Here, the third electrode pad 223 may be disposed between the first and second electrode pads 221 and 222 while being spaced apart therefrom.

The first and second external electrodes 141 to 143 of the multilayer ceramic capacitor 100 may be bonded to the first to third electrode pads 221 to 223 by solders 230, respectively, in a state of being in contact with the first to third electrode pads 221 to 223, respectively, so as to be electrically connected to the board 210.

Meanwhile, in FIG. 9, a reference numeral 224 indicates a ground terminal, and a reference numeral 225 indicates a power terminal.

As set forth above, according to exemplary embodiments in the present disclosure, the dummy electrode disposed on the surface of the ceramic body opposing the mounting surface of the ceramic body may prevent the multilayer ceramic capacitors from being damaged even in the case in which the multilayer ceramic capacitors inserted into the measurement device for testing the electrical characteristics of the multilayer ceramic capacitors collide with one another or are subjected to the friction within the measurement device, and may increase the pick-up rate at the time of performing the pick-up process.

While exemplary embodiments have been shown and described above, it will be apparent to those skilled in the art that modifications and variations could be made without departing from the scope of the present invention as defined by the appended claims.

What is claimed is:

1. A multilayer ceramic capacitor comprising:
   a ceramic body including a plurality of dielectric layers and a plurality of first and second internal electrodes stacked in a width direction thereof;
   a pair of first external electrodes disposed on a mounting surface of the ceramic body to be spaced apart from one another and connected to the plurality of first internal electrodes;
   a second external electrode disposed between the pair of first external electrodes on the mounting surface of the ceramic body and connected to the plurality of second internal electrodes; and
   a dummy electrode substantially covering a whole surface of the ceramic body opposing the mounting surface of the ceramic body,
   wherein the dummy electrode is formed of the same conductive metal as that of the first and second external electrodes.

2. The multilayer ceramic capacitor of claim 1, wherein the first internal electrode includes a first body part disposed to be spaced apart from both end surfaces of the ceramic body in a length direction thereof and a pair of first lead parts extended from the first body part toward the mounting surface of the ceramic body and disposed to be spaced apart from one another in the length direction, and
   the second internal electrode includes a second body part disposed to be spaced apart from both end surfaces of the ceramic body in the length direction and overlapping the first body part in the width direction and a second lead part extended from the second body part toward the mounting surface of the ceramic body and disposed between the pair of first lead parts.

3. The multilayer ceramic capacitor of claim 1, wherein the pair of first external electrodes extend from the mounting surface of the ceramic body onto portions of both end surfaces of the ceramic body in a length direction thereof, respectively.

4. The multilayer ceramic capacitor of claim 1, wherein the pair of first external electrodes extend from the mounting surface of the ceramic body onto portions of both side surfaces of the ceramic body in the width direction, respectively.

5. The multilayer ceramic capacitor of claim 1, wherein the pair of first external electrodes extend from the mounting surface of the ceramic body onto portions of both end surfaces of the ceramic body in a length direction thereof, respectively, and extend from the mounting surface of the ceramic body to portions of both side surfaces of the ceramic body in the width direction, respectively.

6. The multilayer ceramic capacitor of claim 1, wherein the second external electrode extends from the mounting surface of the ceramic body to portions of both side surfaces of the ceramic body in the width direction.

7. A mounting board for mounting a multilayer ceramic capacitor, comprising:
   a board having a plurality of electrode pads disposed thereon; and
   the multilayer ceramic capacitor of claim 1 mounted on the electrode pads of the board.

8. A multilayer ceramic capacitor comprising:
   a ceramic body including a plurality of dielectric layers, and a plurality of first and second internal electrodes stacked in a width direction of the ceramic body and including lead parts exposed to a first surface of the ceramic body;
   first and second external electrodes disposed on the first surface of the ceramic body and electrically connected to the exposed lead parts of the plurality of first and second internal electrodes; and
   an electrically conductive dummy electrode disposed on a second surface of the ceramic body opposing the first surface of the ceramic body and electrically isolated from any of the plurality of the first and second internal electrodes.

9. The multilayer ceramic capacitor of claim 8, wherein the first external electrode extends from the first surface of the ceramic body onto a portion of an end surface of the ceramic body in a length direction thereof, respectively.

10. The multilayer ceramic capacitor of claim 8, wherein the first external electrode extends from the first surface of the ceramic body onto portions of both side surfaces of the ceramic body in the width direction, respectively.

11. The multilayer ceramic capacitor of claim 8, wherein the first external electrode extends from the first surface of the ceramic body onto a portion of an end surface of the ceramic body in a length direction thereof, respectively, and extends from the first surface of the ceramic body to portions of both side surfaces of the ceramic body in the width direction, respectively.

12. The multilayer ceramic capacitor of claim 8, wherein the second external electrode extends from the first surface of the ceramic body to portions of both side surfaces of the ceramic body in the width direction.

13. The multilayer ceramic capacitor of claim 8, wherein the electrically conductive dummy electrode entirely covers the second surface of the ceramic body.

14. The multilayer ceramic capacitor of claim 8, wherein the electrically conductive dummy electrode includes first and second dummy electrodes disposed on the second surface of the ceramic body to be spaced apart from one another in the width direction.

15. The multilayer ceramic capacitor of claim 14, wherein the first and second dummy electrodes extend onto portions of end surfaces of the ceramic body, respectively.

16. The multilayer ceramic capacitor of claim 8, wherein the electrically conductive dummy electrode includes first and second dummy electrodes formed on the second surface of the ceramic body to be spaced apart from one another in a length direction thereof.

17. The multilayer ceramic capacitor of claim 16, wherein the first and second dummy electrodes extend onto portions of side surfaces of the ceramic body, respectively.

18. The multilayer ceramic capacitor of claim 8, wherein the electrically conductive dummy electrode is disposed as a frame along edges of the second surface of the ceramic body.

19. The multilayer ceramic capacitor of claim 18, wherein the electrically conductive dummy electrode extends onto portions of the respective side surfaces or end surfaces of the ceramic body.

20. The multilayer ceramic capacitor of claim 8, wherein the electrically conductive dummy electrode is formed of the same conductive metal as that of the first and second external electrodes.

* * * * *